(12) United States Patent
Gao et al.

(10) Patent No.: US 12,066,642 B2
(45) Date of Patent: Aug. 20, 2024

(54) LIGHT FIELD DISPLAY APPARATUS AND DISPLAY METHOD THEREOF

(71) Applicant: BOE Technology Group Co., Ltd., Beijing (CN)

(72) Inventors: Jian Gao, Beijing (CN); Sen Ma, Beijing (CN); Xiaochuan Chen, Beijing (CN); Tao Hong, Beijing (CN); Yanliu Sun, Beijing (CN)

(73) Assignee: BOE Technology Group Co., Ltd., Beijing (CN)

( * ) Notice: Subject to any disclaimer, the term of this patent is extended or adjusted under 35 U.S.C. 154(b) by 0 days.

(21) Appl. No.: 17/765,020

(22) PCT Filed: Apr. 28, 2021

(86) PCT No.: PCT/CN2021/090496
§ 371 (c)(1),
(2) Date: Nov. 3, 2022

(87) PCT Pub. No.: WO2022/226829
PCT Pub. Date: Nov. 3, 2022

(65) Prior Publication Data
US 2024/0069357 A1 Feb. 29, 2024

(51) Int. Cl.
*G02B 30/10* (2020.01)
*G02B 30/27* (2020.01)
(Continued)

(52) U.S. Cl.
CPC ............ *G02B 30/10* (2020.01); *G02B 30/27* (2020.01); *H04N 13/305* (2018.05); *H04N 13/383* (2018.05); *H04N 13/398* (2018.05)

(58) Field of Classification Search
CPC ...... G02B 30/10; G02B 30/27; H04N 13/305; H04N 13/383; H04N 13/398
(Continued)

(56) References Cited

U.S. PATENT DOCUMENTS 6,061,179 A * 5/2000 Inoguchi ................ H04N 13/32
348/E13.028
10,566,368 B1 * 2/2020 Wu ...................... H01L 27/1463
(Continued)

FOREIGN PATENT DOCUMENTS

| CN | 104820292 A | 8/2015 |
| CN | 110266842 A | 9/2019 |

(Continued)

*Primary Examiner* — Matthew David Kim
(74) *Attorney, Agent, or Firm* — IPro, PLLC

(57) ABSTRACT

A display panel includes a plurality of sets of pixel strips extending in a first direction and arranged in a second direction, each set of pixel strips includes a plurality of sub-pixel strips in different colors, spacing between every two adjacent sub-pixels in each sub-pixel strip in the first direction is smaller than or equal to 2 μm, each set of pixel strips is divided into a plurality of pixel islands arranged in an array in the first direction, each pixel island includes at least four sub-pixels extending in the first direction in each corresponding sub-pixel strip, a width of a view region formed by light emitted by each sub-pixel in each pixel island being propagated to a human eye through a corresponding lens is smaller than or equal to a pupil diameter.

11 Claims, 20 Drawing Sheets

(51) Int. Cl.
*H04N 13/305* (2018.01)
*H04N 13/383* (2018.01)
*H04N 13/398* (2018.01)

(58) Field of Classification Search
USPC .......................................................... 348/59
See application file for complete search history.

(56) References Cited

U.S. PATENT DOCUMENTS

| | | | |
|---|---|---|---|
| 11,477,427 B2 * | 10/2022 | Wong | H04N 13/167 |
| 11,487,172 B1 * | 11/2022 | Gao | G02F 1/133567 |
| 2005/0024590 A1 * | 2/2005 | Pezzaniti | H04N 13/305 |
| | | | 348/E13.029 |
| 2007/0183033 A1 * | 8/2007 | Schwerdtner | H04N 13/305 |
| | | | 359/463 |
| 2009/0146915 A1 * | 6/2009 | Marathe | G06F 3/1438 |
| | | | 348/E7.083 |
| 2016/0073097 A1 * | 3/2016 | Hamagishi | H04N 13/383 |
| | | | 348/59 |
| 2019/0333904 A1 * | 10/2019 | Cho | H01L 33/38 |
| 2020/0152917 A1 * | 5/2020 | Kudo | H10K 50/856 |
| 2020/0266318 A1 * | 8/2020 | Lee | H01L 25/0753 |
| 2022/0317523 A1 * | 10/2022 | Chen | G02F 1/13439 |

FOREIGN PATENT DOCUMENTS

| | | |
|---|---|---|
| CN | 111552093 A | 8/2020 |
| CN | 111624784 A | 9/2020 |
| CN | 211528831 U | 9/2020 |
| CN | 111766716 A | 10/2020 |
| GB | 2363505 A | 12/2001 |

* cited by examiner

LIGHT FIELD DISPLAY APPARATUS AND DISPLAY METHOD THEREOF

This application is a National Stage of International Application No. PCT/CN2021/090496, filed on Apr. 28, 2021, which is hereby incorporated by reference in its entirety.

FIELD

The present disclosure relates to the field of display technology, and particularly to a light field display apparatus and a display method thereof.

BACKGROUND

In a current near-eye display technology, stereoscopic vision is formed for a 3D object by displaying different images to left and right eyes of a user respectively, and 3D display formed based on the stereoscopic vision of human eyes can lead to a problem of convergence conflict, that is, monocular focusing and binocular convergence are not on the same plane. The convergence conflict may cause visual fatigue and dizziness. How to solve the problem of the convergence conflict has become an urgent problem to be solved.

SUMMARY

An embodiment of the present disclosure provides a light field display apparatus, including: a display panel, including a plurality of sets of pixel strips extending in a first direction and arranged in a second direction, where the first direction intersects with the second direction, each set of pixel strips includes a plurality of sub-pixel strips in different colors, each sub-pixel strip includes a plurality of sub-pixels in a same color, spacing between every two adjacent sub-pixels in each sub-pixel strip in the first direction is smaller than or equal to 2 μm, each set of pixel strips is divided into a plurality of pixel islands arranged in an array in the first direction, and each pixel island includes at least four sub-pixels extending in the first direction in each corresponding sub-pixel strip; a light-transmitting spacer layer, located on a light-emitting side of the display panel; and a lens structure, located on a side of the light-transmitting spacer layer facing away from the display panel, where the lens structure includes a plurality of lenses arranged in an array.

A width of a view region formed by light emitted by each sub-pixel in each pixel island being propagated to a human eye through a corresponding lens is smaller than or equal to a pupil diameter, and a distance between centers of view regions formed by light emitted by adjacent sub-pixels in each pixel island being propagated to the human eye through the corresponding lens is smaller than or equal to a pupil radius.

A width of an orthographic projection of each pixel island on the display panel is equal to an aperture of the corresponding lens in the first direction.

Optionally, in the light field display apparatus provided by an embodiment of the present disclosure, the spacing between every two adjacent sub-pixels in each sub-pixel strip is 0 μm-1 μm.

Optionally, in the light field display apparatus provided by an embodiment of the present disclosure, one of the lenses corresponds to one of the pixel islands, or one of the lenses corresponds to a plurality of the pixel islands.

Optionally, in the light field display apparatus provided by an embodiment of the present disclosure, the lens structure includes: a lens layer located on the side of the light-transmitting spacer layer facing away from the display panel, a flat layer located on a side of the lens layer facing away from the display panel, and a first substrate located on a side of the flat layer facing away from the display panel, wherein the lens layer includes the plurality of lenses arranged in an array, and a refractive index of the lens layer is larger than a refractive index of the flat layer.

Optionally, in the light field display apparatus provided by an embodiment of the present disclosure, the lenses are cylindrical lenses, and the plurality of lenses are closely arranged.

A placing height H of each lens satisfies $$H = \frac{2nLp_{pixel}}{\Phi}.$$

The placing height H of each lens is a distance between the lens layer and the display panel, n is a refractive index of a dielectric layer between the lens layer and the display panel, $p_{pixel}$ is a width of each sub-pixel in the first direction, L is a distance between the human eye and the lens layer, and Φ is the pupil diameter of the human eye.

Optionally, in the light field display apparatus provided by an embodiment of the present disclosure, a curvature radius of each lens satisfies:

$$\frac{H}{n} = \frac{r}{n_1 - n_2}.$$

H is the placing height of the lens, r is the curvature radius of the lens, n is a refractive index of a film layer between the lens layer and the display panel, $n_1$ is the refractive index of the lens layer, $n_2$ is the refractive index of the flat layer, and $n_1 > n_2$.

The width of the view region formed by the light emitted by each sub-pixel being propagated to the human eye through the lens satisfies: $w = D + 2L \tan \theta$.

$$\theta = \frac{\lambda}{D},$$

θ is a diffraction angle of the light emitted by the sub-pixel, λ is a wavelength of the light emitted by the sub-pixel, D is the aperture of the lens, and L is the distance between the human eye and the lens layer.

Optionally, in the light field display apparatus provided by an embodiment of the present disclosure, the aperture D of the lens is larger than 330 μm.

Optionally, in the light field display apparatus provided by an embodiment of the present disclosure, the placing height H of the lens is 4.88 mm, the curvature radius r of the lens is 690 μm, and the aperture D of the lens is 598 μm.

Optionally, in the light field display apparatus provided by an embodiment of the present disclosure, the lenses are liquid crystal lenses or liquid lenses.

Optionally, in the light field display apparatus provided by an embodiment of the present disclosure, focal lengths of the lenses are equal.

Correspondingly, an embodiment of the present disclosure further provides a display method of the above light field display apparatus, including: obtaining, through an eye tracking system, location information of a focusing location of a pupil of the human eye relative to the display panel; determining view information watched by the human eye according to the obtained location information of the focusing location of the pupil of the human eye relative to the display panel; determining a target sub-pixel in a pixel island corresponding to the view information according to the view information; and controlling the determined target sub-pixel to perform corresponding 3D image display and controlling other non-target sub-pixels to be turned off.

BRIEF DESCRIPTION OF THE DRAWINGS

In order to more clearly illustrate technical solutions in embodiments of the present disclosure, the accompanying drawings required in the description of embodiments will be briefly introduced below. Obviously, the accompanying drawings in the following description are only some embodiments of the present disclosure. For those of ordinary skill in the art, other drawings can also be obtained from these drawings without any creative effort.

DETAILED DESCRIPTION OF EMBODIMENTS

Figure 1:
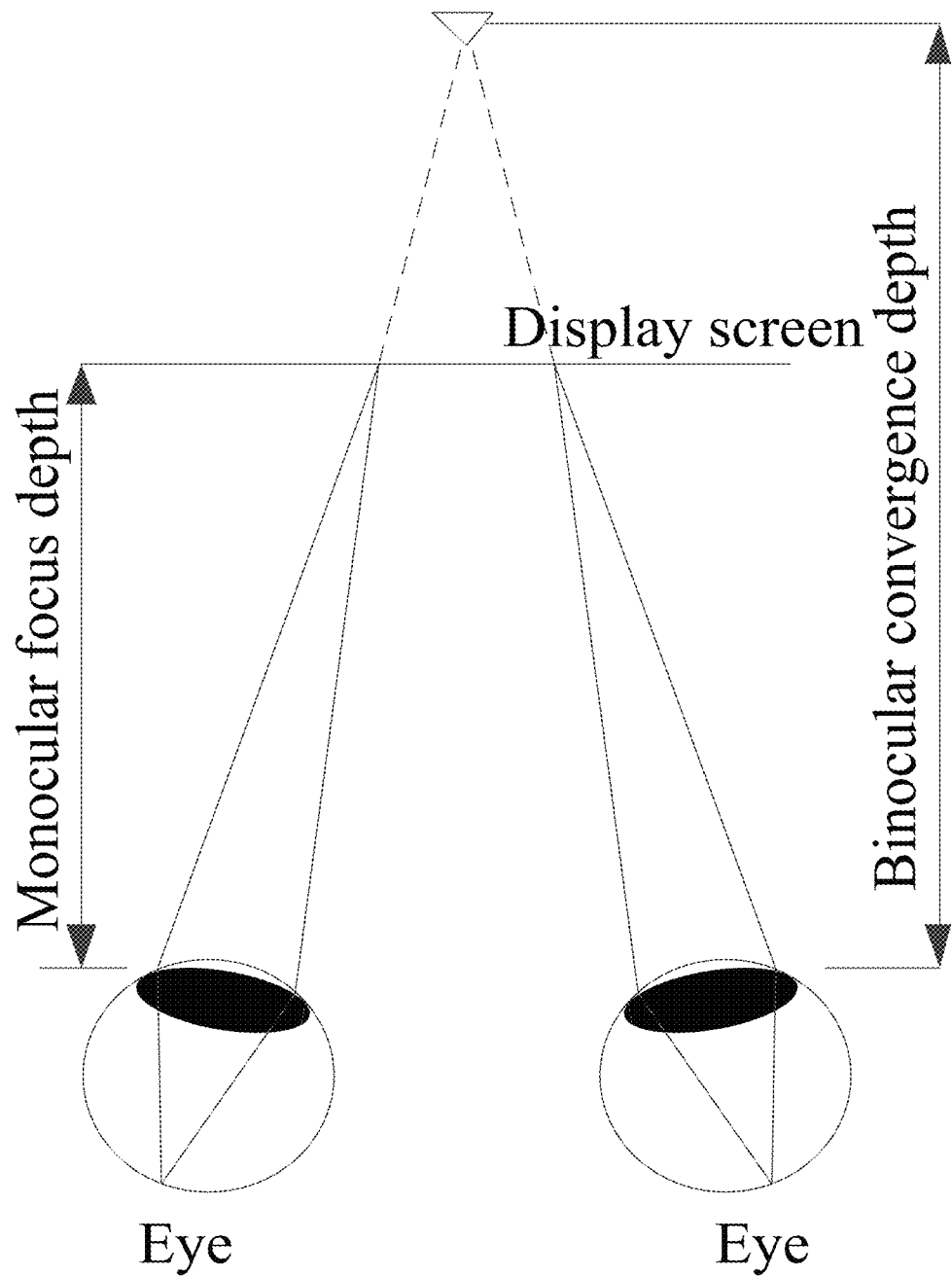
FIG. 1 is a schematic diagram of monocular focusing and binocular convergence provided by the related art.

In order to make objectives, technical solutions and advantages of embodiments of the present disclosure clearer, the technical solutions of embodiments of the present disclosure will be clearly and completely described below with reference to the accompanying drawings of embodiments of the present disclosure. Obviously, the described embodiments are a part of embodiments of the present disclosure, rather than all embodiments. Further, embodiments of the present disclosure and features of embodiments may be combined with each other under a condition of no conflict. Based on the described embodiments of the present disclosure, all other embodiments obtained by those of ordinary skill in the art without creative efforts fall within the protection scope of the present disclosure.

Unless otherwise defined, technical or scientific terms used in the present disclosure shall have the ordinary meaning as understood by those of ordinary skill in the art to which this present disclosure belongs. "First", "second" and similar words used in the present disclosure do not represent any order, quantity, or importance, but are merely used to distinguish different components. Similar words such as "comprise" or "include" mean that elements or items appearing before the words encompass elements or items recited after the words and their equivalents, but do not exclude other elements or items. Similar words such as "connected" or "linked" are not limited to physical or mechanical connections, but may include electrical connections, whether direct or indirect.

It should be noted that dimensions and shapes of figures in the accompanying drawings do not reflect a real scale, and are only intended to illustrate the present disclosure. The same or similar reference numerals refer to the same or similar elements or elements having the same or similar functions throughout.

When a user is watching a parallax-based 3D display apparatus, as shown in FIG. 1, a monocular focusing depth is not consistent with a binocular convergence depth, thus resulting in visual fatigue and further causing bad experiences of the user, such as dizziness.

Figure 2:
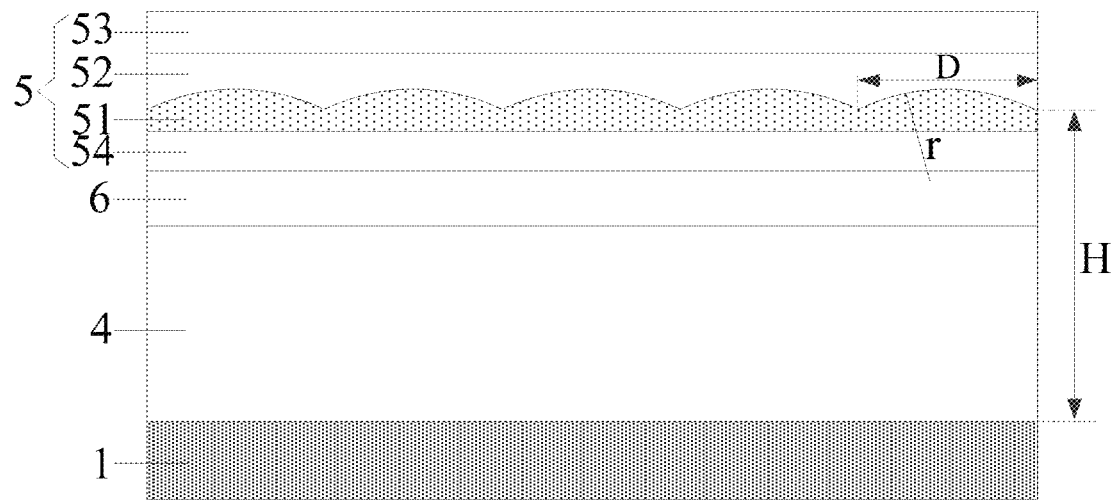
FIG. 2 is a schematic structural diagram of a light field display apparatus provided by an embodiment of the present disclosure.

In order to solve the above problem, an embodiment of the present disclosure provides a light field display apparatus, as shown in FIG. 2, including following parts.

Figure 3:
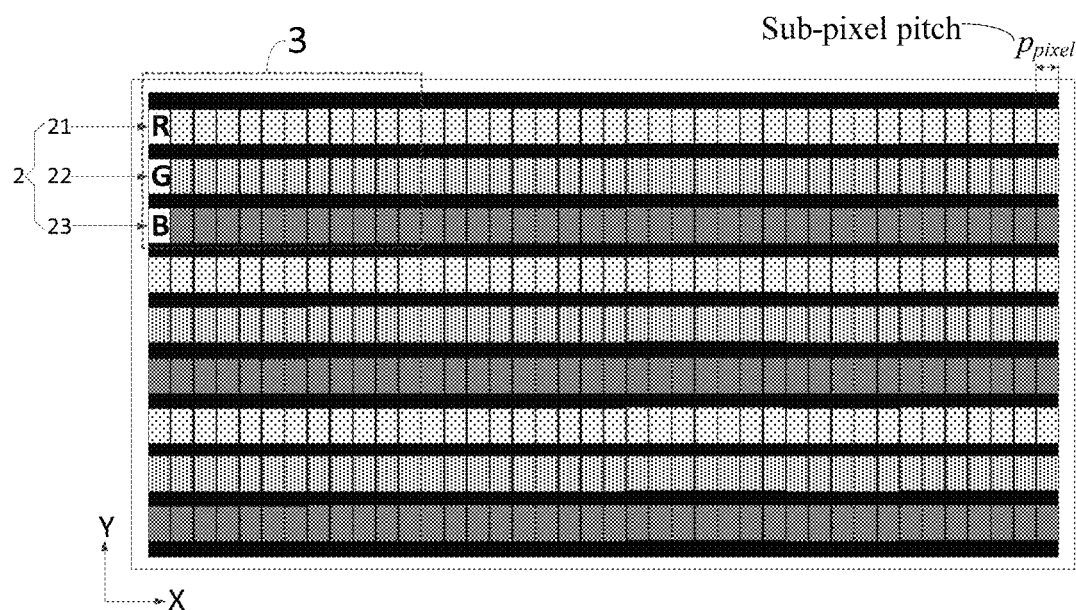
FIG. 3 is a schematic diagram of pixel strips in a display panel provided by an embodiment of the present disclosure.

A display panel 1, as shown in FIG. 3, includes a plurality of sets of pixel strips 2 extending in a first direction X and arranged in a second direction Y The first direction X intersects with the second direction Y Each set of pixel strips 2 includes a plurality of sub-pixel strips in different colors (for example, a red sub-pixel strip 21, a green sub-pixel strip 22 and a blue sub-pixel strip 23). Each sub-pixel strip includes a plurality of sub-pixels in a same color (for example, the red sub-pixel strip 21 includes a plurality of red sub-pixels R in the same color, the green sub-pixel strip 22 includes a plurality of green sub-pixels G in the same color and the blue sub-pixel strip 23 includes a plurality of blue sub-pixels B in the same color). Spacing between every two adjacent sub-pixels in each sub-pixel strip is smaller than or equal to 2 μm in the first direction X, for example, spacing between adjacent red sub-pixels R in the red sub-pixel strip 21 is smaller than or equal to 2 μm. Each set of pixel strips 2 is divided into a plurality of pixel islands 3 arranged in an array in the first direction X, and each pixel island 3 includes at least four sub-pixels extending in the first direction X in each corresponding sub-pixel strip (an embodiment of the present disclosure takes 12 sub-pixels as an example, which is not limited; for example, each pixel island 3 includes 12 red sub-pixels R in the corresponding red sub-pixel strip 21, 12 green sub-pixels G in the corresponding green sub-pixel strip 22 and 12 blue sub-pixels B in the corresponding blue sub-pixel strip 23).

A light-transmitting spacer layer 4 is located on a light-emitting side of the display panel 1.

A lens structure 5 is located on a side of the light-transmitting spacer layer 4 facing away from the display panel 1. The lens structure 5 includes a plurality of lenses 51 arranged in an array.

A width of a view region formed by light emitted by each sub-pixel in each pixel island 3 being propagated to a human eye through a corresponding lens 51 is smaller than or equal to a pupil diameter, and a distance between centers of view regions formed by light emitted by adjacent sub-pixels in each pixel island 3 being propagated to the human eye through the corresponding lens 51 is smaller than or equal to a pupil radius.

Figure 4:
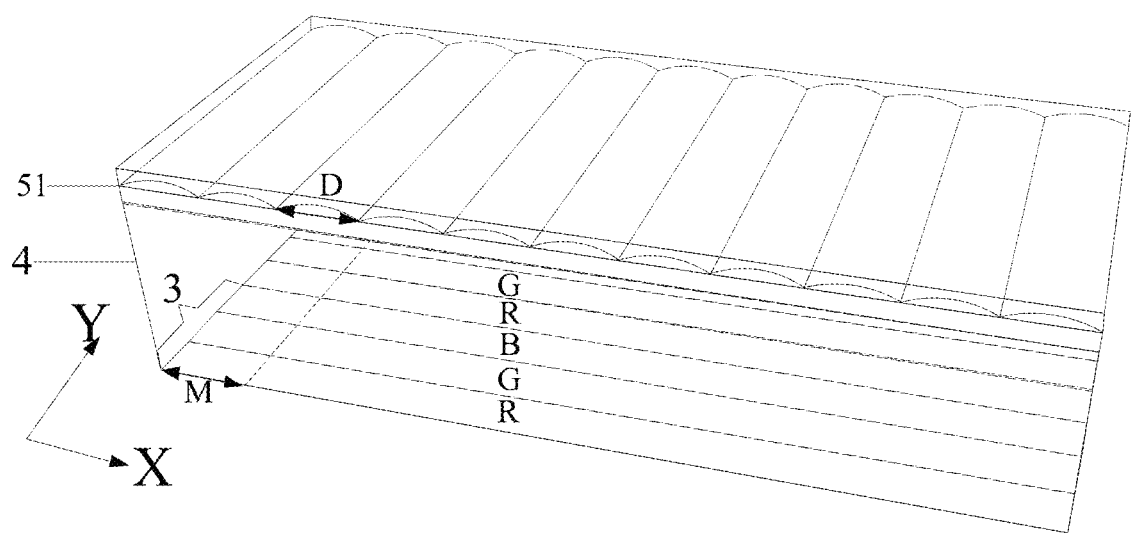
FIG. 4 is a schematic stereogram of pixel strips and lenses provided by an embodiment of the present disclosure.

As shown in FIG. 4, a width M of an orthographic projection of each pixel island 3 on the display panel 1 in the first direction X is equal to an aperture D of the corresponding lens 51. The aperture of the lens here refers to a cycle of the lens 51, or, the aperture of the lens is a width of the lens 51 in the first direction X.

It should be noted that, each pixel island 3 includes at least four sub-pixels extending in the first direction X in each corresponding sub-pixel strip, so that each eye can see the light emitted by two sub-pixels, thus realizing 3D display.

It should be noted that FIG. 3 only illustrates a part of pixel strips. In practical application, a quantity of the pixel strips and a quantity of the sub-pixels included in each sub-pixel strip are much larger than that illustrated in FIG. 3. For example, there may be 1920*12 sub-pixels in the X direction, and there may be 1080*3 sub-pixels in the Y direction. FIG. 4 illustrates the lens structure corresponding to a part of pixel strips as well.

The plurality of lenses 51 arranged in an array in FIG. 2 are relatively small in pitch, so it may also be called a micro lens array. Shapes and pitches of the lenses 51 are not limited here.

For example, the lenses 51 have a convergence effect on light, and may be, for example, cylindrical lenses.

It should be noted that, a design of set heights, curvature radius and other parameters of the cylindrical lenses needs to satisfy that the display panel is located on focal planes of the plurality of cylindrical lenses. In this way, light emitted by the display panel passes the lenses to be converted into collimated light, to form a beam in a known direction.

It should be noted that, it is an ideal design that the display panel is located on the focal planes of the plurality of cylindrical lenses. Because the focal planes of the plurality of cylindrical lenses are cambered surfaces while the display panel is a plane, the display panel cannot be located on the focal planes of the cylindrical lenses. For example, the display panel may be located on central locations of the focal planes of the cylindrical lenses, and may also be located on edge regions of the focal planes of the cylindrical lenses. A practical location of the display panel needs to be designed according to the set heights, the curvature radius and other parameters of the cylindrical lenses to achieve an optimal optical effect.

The above display panel may be a rigid display panel, and may also be a flexible display panel (i.e. bendable, foldable).

The display panel may be may be a TN (Twisted Nematic), VA (Vertical Alignment), IPS (In-Plane Switching) or ADS (Advanced Super Dimension Switch) liquid crystal display panel, may also be an OLED (Organic Light-Emitting Diode) display panel or a QLED (Quantum Dot Light-Emitting Diode), and may also be a Micro OLED display panel, a Micro LED display panel or a Mini LED display panel, which may be determined according to actual requirements.

A light field display principle of the light field display apparatus provided by an embodiment of the present disclosure will be described below.

Light field display is a type of true 3D display and can realize a true 3D scene that is like the real world. In general, the beam having the known direction is called a light field in space. In the light field, beams entering the pupil need to have points of intersection for imaging in space. Therefore, it can be known from a geometrical relationship that, collimated beams emitted by more than two adjacent sub-pixels need to enter a pupil of a single eye simultaneously, each sub-pixel represents a beam and corresponds to a viewpoint, i.e. the single eye may receive at least two viewpoints simultaneously. The light emitted by the sub-pixel is propagated to a location of the pupil of the human eye through the corresponding lens to form the view region. A monocular depth of field surface of light field is adjustable, and clear-blur switch of different depth of field surfaces may be realized through human eye crystalline lens focalization, so that monocular focusing and binocular convergence are on the same plane.

Figure 5:
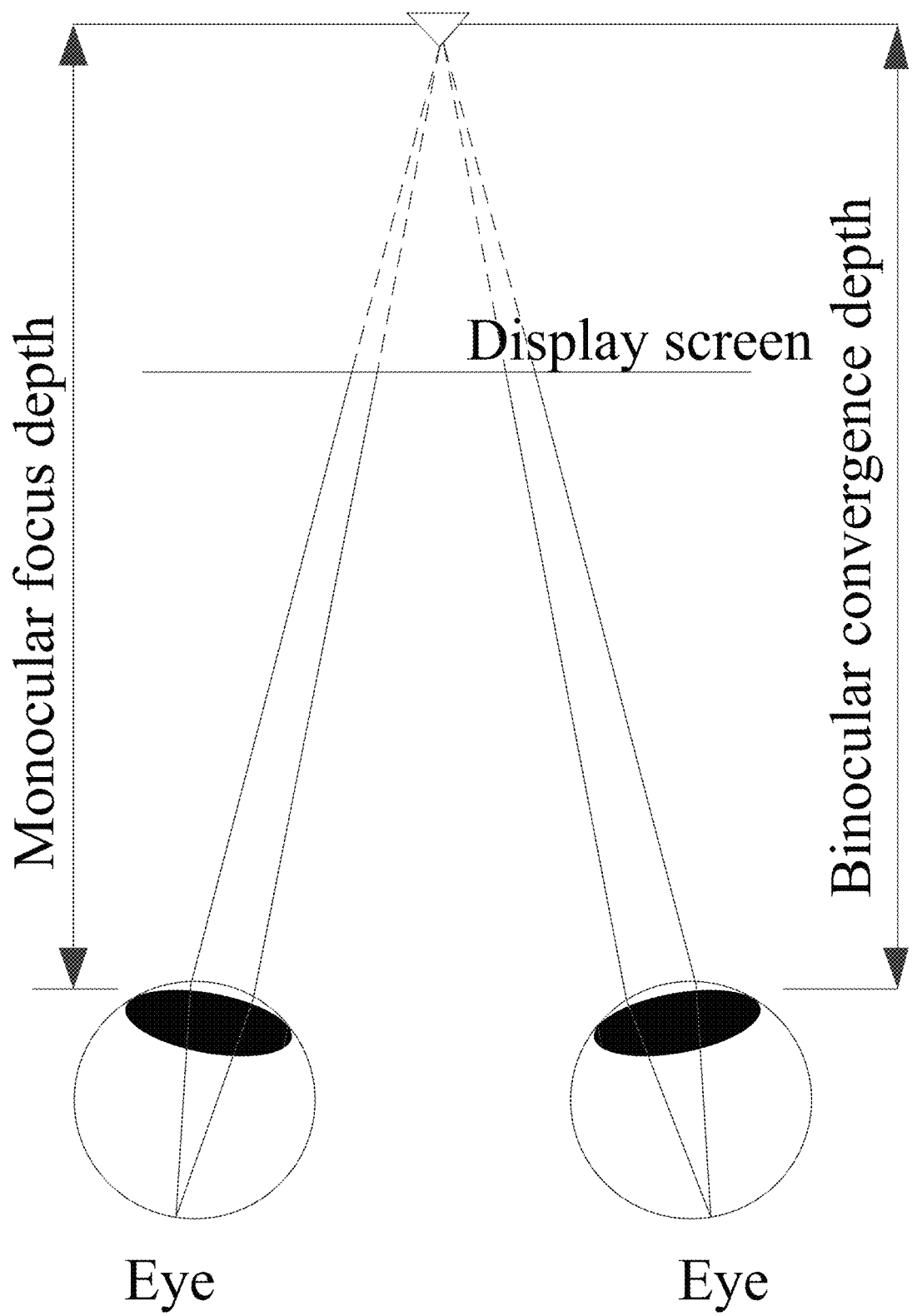
FIG. 5 is a schematic diagram of monocular focusing and binocular convergence provided by an embodiment of the present disclosure.

The light field display apparatus provided by the present disclosure is obtained based on the above principle and may provide an effective light field that can be recognized by human eyes. When a user is watching a 3D picture through the light field display apparatus, as shown in FIG. 5, monocular focusing and binocular convergence are on the same plane (i.e. a monocular focus depth and a binocular convergence depth are equal), no feel of dizziness is caused during watching, and therefore, visual fatigue caused by inconsistent monocular focus depth and binocular convergence depth in the related art is avoided.

In the light field display apparatus provided by an embodiment of the present disclosure, the light-transmitting spacer layer is arranged between the lens structure and the display panel to ensure spacing between the lens structure and the display panel, so that the display panel is arranged on the focal planes of the plurality of lenses and the light emitted by the pixel islands is collimated, thereby forming the beams with known directions (i.e., the light field in space). In the light field, the view region formed by the light emitted by each sub-pixel in each pixel island being propagated to the human eye through the corresponding lens is smaller than or equal to the pupil radius, and the distance between the centers of the view regions formed by the light emitted by the adjacent sub-pixels in each pixel island being propagated to the human eye through the corresponding lens is smaller than or equal to the pupil radius, so the single eye pupil may receive at least two viewpoints simultaneously, thereby realizing light field display. Therefore, if different viewpoints formed by the light field display apparatus reflect different pictures, a monocular focusing 3D display effect can be realized. At this moment, the single eye is no longer focused on a display screen, but focused on a 3D picture displayed, so that monocular focusing and binocular convergence are on the same plane. Therefore, visual fatigue caused by inconsistent monocular focus depth and binocular convergence depth is avoided, thereby avoiding the feel of dizziness of the user.

In the light field display apparatus provided by an embodiment of the present disclosure, the display panel includes the plurality of sets of pixel strips, each set of pixel strips includes the plurality of sub-pixel strips in different colors, each sub-pixel strip includes the plurality of sub-pixels in the same color, and in the first direction, the spacing between two adjacent sub-pixels in each sub-pixel strip is smaller than or equal to 2 µm, so each sub-pixel strip forms a continuous light-emitting surface and each set of pixel strips may be divided into a plurality of types of pixel islands, i.e. a design of the plurality of types of pixel islands may be performed on the same display panel. Correspondingly, a design of a plurality of types of lens pitches may be performed, and intelligent 3D display with a plurality of resolutions and a plurality of visual spaces that can be switched can be realized. In an embodiment of the present disclosure, the width of the orthographic projection of each pixel island on the display panel is equal to the aperture of the corresponding lens, so that vision regions projected by the pixel islands in space through the lenses may be connected with one another in a seamless mode, thereby realizing an ultra-large continuous 3D visual space. In addition, spacing between the pixel islands divided in each set of pixel strips is smaller than or equal to 2 µm, so a moire effect may be eliminated. Therefore, the light field display apparatus provided by an embodiment of the present disclosure can realize light field 3D display with low interference, zero moire effect and a plurality of viewpoints.

During specific implementation, in order to ensure that each sub-pixel strip form a continuous light-emitting surface to realize almost thorough elimination of the moire effect, in the above light field display apparatus provided by an embodiment of the present disclosure, the spacing between every two adjacent sub-pixels in each sub-pixel strip may be 0 µm-1 µm.

During specific implementation, in the above light field display apparatus provided by an embodiment of the present disclosure, one lens may correspond to one pixel island. In order to lower difficulty of a manufacturing process, as shown in FIG. 4, optionally, in an embodiment of the present disclosure, one lens 51 corresponds to a plurality of pixel islands 3 in the second direction Y.

During specific implementation, in the above light field display apparatus provided by an embodiment of the present disclosure, as shown in FIG. 2, the lens structure 5 includes: a lens layer located on the side of the light-transmitting spacer layer 4 facing away from the display panel 1, a flat layer 52 located on a side of the lens layer facing away from the display panel 1, and a first substrate 53 located on a side of the flat layer 52 facing away from the display panel 1. The lens layer includes the plurality of lenses 51 arranged in an array, and a refractive index of the lens layer is larger than a refractive index of the flat layer 52. As shown in FIG. 2, the lens structure 5 is bonded to the display panel 1 through an optical adhesive 6.

Optionally, in the above light field display apparatus provided by an embodiment of the present disclosure, as shown in FIG. 2, the lens structure 5 may further include a second substrate 54 located between the lens layer and the optical adhesive 6.

In some embodiments, a material of the light-transmitting spacer layer may be glass.

In some embodiments, materials of the first substrate and the second substrate may be polyethylene terephthalate (PET).

In some embodiments, materials of the lens layer and the flat layer may be resin. A refractive index of the resin selected for the lens layer is larger than a refractive index of the resin selected for the flat layer.

It should be noted that, an embodiment of the present disclosure adopts the high-refractive-index lens layer located on a lower side and the low-refractive-index flat layer located on an upper side to form a convex lens structure. Of course, it may also adopt a high-refractive-index resin layer located on the upper side and a low-refractive-index resin layer located on the lower side to form a convex lens structure made of the high-refractive-index resin layer.

During specific implementation, in the light field display apparatus provided by an embodiment of the present disclosure, as shown in FIG. 2, focal lengths of the lenses 51 are equal.

During specific implementation, in the light field display apparatus provided by an embodiment of the present disclosure, the lenses may be liquid crystal lenses or liquid lenses.

Figure 6:
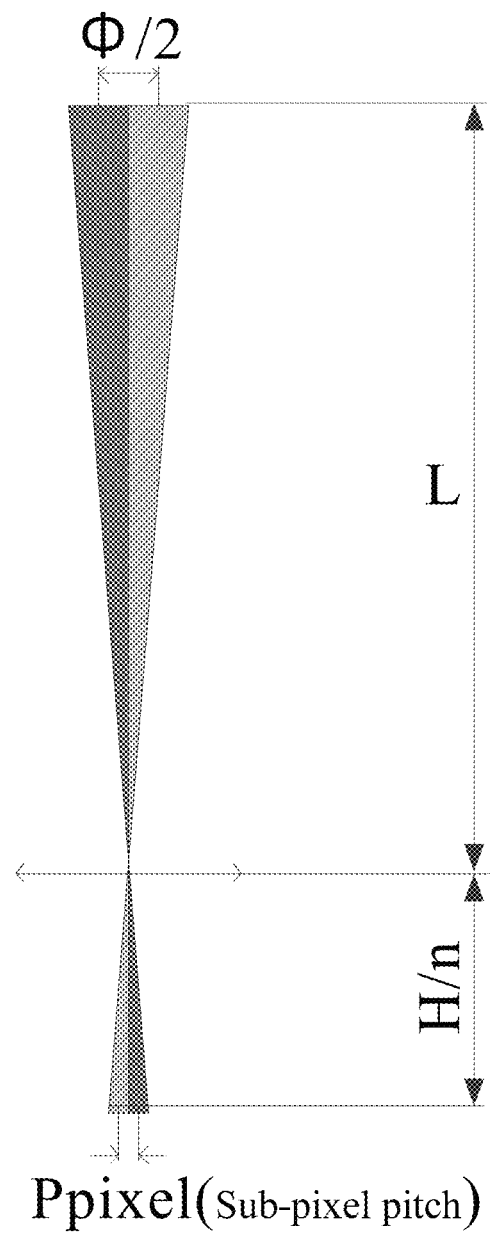
FIG. 6 is a diagram of a light path after two sub-pixels and a cylindrical lens are equivalent to an air layer.

During specific implementation, in the light field display apparatus provided by an embodiment of the present disclosure, as shown in FIG. 2 to FIG. 4, the lenses 51 are cylindrical lenses, and the plurality of lenses 51 are closely arranged. As shown in FIG. 6, FIG. 6 is a diagram of a light path after the two sub-pixels and the cylindrical lens are equivalent to an air layer. By designing a placing height H of a cylindrical lens array, distances between projection centers of beams of the sub-pixels at an optimal watching location L of a product is the pupil radius (Φ/2), and the distances of the projection centers of the beams are distances between centers of view regions formed by the light emitted by the adjacent sub-pixels in each pixel island being propagated to the human eye through the corresponding lens, so a demand of a plurality of viewpoints (more than two viewpoints) of the pupil is satisfied. The placing height H of the lenses 51 satisfies:

$$H = \frac{2nLp_{pixel}}{\Phi}. \tag{1}$$

The placing height H of the lenses 51 is a distance between the lens layer and the display panel 1, n is a refractive index of a dielectric layer between the lens layer and the display panel 1, $p_{pixel}$ is a width of each sub-pixel in the first direction X, L is a distance between the human eye and the lens layer, and Φ is the pupil diameter of the human eye.

It should be noted that, a thickness of the light-transmitting spacer layer is much larger than thicknesses of the second substrate and the optical adhesive. In the present disclosure, n is the refractive index of the dielectric layer between the lens layer and the display panel 1, which refers to that n is the refractive index of the light-transmitting spacer layer, and refractive indexes of other dielectric layers between the display panel and the lens layer are ignored to simplify the above formula (1).

In an embodiment of the present disclosure, $p_{pixel}$ is equal to 13 µm, n=1.5, L=500 mm, and Φ=4 mm, so H=4.88 mm is obtained.

The apertures and curvature radiuses of the cylindrical lenses need to be designed in a matched mode, and a design thought includes: 1) according to ideal lenses, light-emitting surfaces of pixels are located on focal planes of the cylindrical lenses, and theoretical curvature radiuses of the cylindrical lenses are preliminarily determined; 2) diffraction limitation is considered, and in order to make projection peaks of the sub-pixels recognizable, limitation conditions of the apertures of the cylindrical lenses are determined; 3) software simulation and curvature radius optimization are performed taking aberration of the cylindrical lenses into consideration, so that full-screen projection peaks of the sub-pixels are all recognizable, thus determining an optimal curvature radius; and 4) finally, the apertures of the cylindrical lenses are scanned (i.e. the apertures of the cylindrical lenses are changed) to obtain low-interference visual spaces and 3D display resolutions under different apertures. A specific design process of the apertures and the curvature radiuses of the cylindrical lenses is as follows.

Theoretical calculation of the curvature radiuses and determination of the limitation conditions of the apertures: first, to enable projections of the beams of the sub-pixels at a distance L (optimal watching distance) location between the human eye and the lens layer to be minimum and obtain the low-interference visual spaces, in a theoretical design, the light-emitting surfaces of the pixels are located on the focal planes of the cylindrical lenses. Taking the cylindrical lenses with combination of high-refractive-index and low-refractive-index resin shown in FIG. 2 as an example, the curvature radius r of each lens 51 satisfies:

$$\frac{H}{n} = \frac{r}{n_1 - n_2}. \tag{2}$$

H is the placing height of the ens, r is the curvature radius of the lens, n is a refractive index of a film layer between the lens layer and the display panel, $n_1$ is the refractive index of the lens layer, $n_2$ is the refractive index of the flat layer, and $n_1 > n_2$. For example, n=1.5, $n_1$=1.61, $n_2$=1.41, and H=4.88 mm obtained from calculation of the aforesaid formula (1) are taken into formula (2), and the curvature radius r=0.65 mm of the lens is obtained.

Figure 7A:
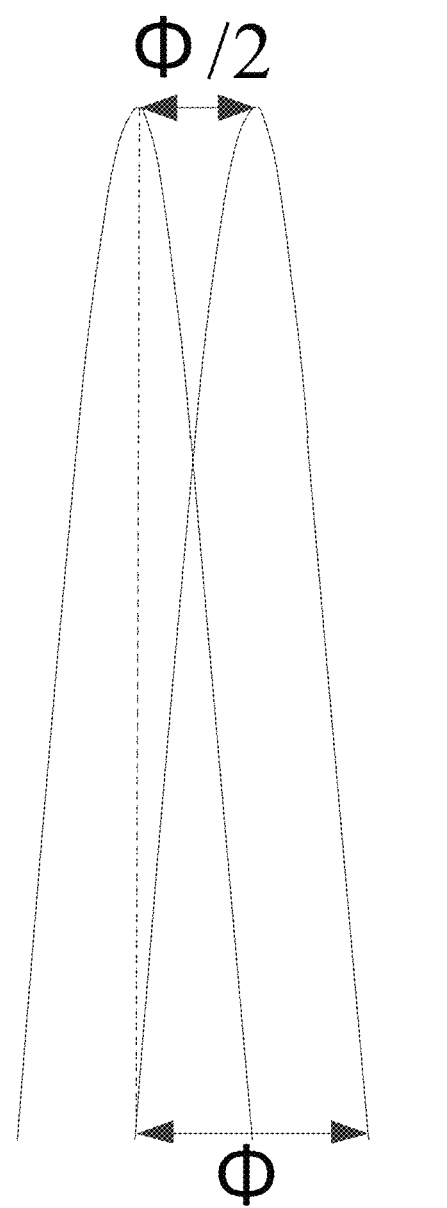
FIG. 7A is a schematic diagram of energy projection peaks of sub-pixels being recognizable.
Figure 7B:
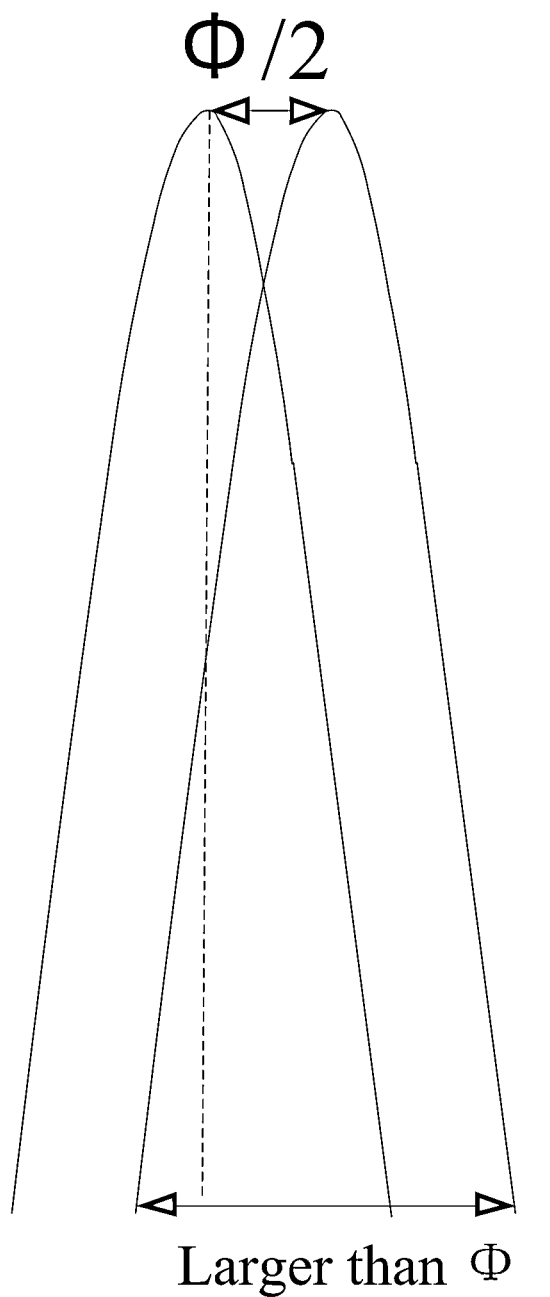
FIG. 7B a schematic diagram of energy projection peaks of sub-pixels being non-recognizable.

The above curvature radius of the cylindrical lens is a theoretical calculation value, and a practical manufacturing value needs to be optimized in combination of the aperture of the cylindrical lens, so that the full-screen projection peaks of the sub-pixels are recognizable. In order to make the projection peaks of the sub-pixels recognizable, energy projection peaks of the sub-pixels need to satisfy recognition conditions shown in FIG. 7A and FIG. 7B, i.e. when spacing between the energy projection peaks of the sub-pixels is Φ/2, a projection width of each sub-pixel cannot be larger than Φ. Φ is the pupil diameter of the human eye and is generally valued at 4 mm. Therefore, the spacing between the energy projection peaks of the sub-pixels is designed to be 2 mm, which requires that the projection width of each sub-pixel is smaller than 4 mm.

The limitation conditions of the apertures of the cylindrical lenses may be determined according to the recognition conditions of the spacing between the sub-pixels and in combination with a diffraction theory. Diffraction may cause larger projection pitches of the beams. Specific reasons are as follows.

Figure 8:
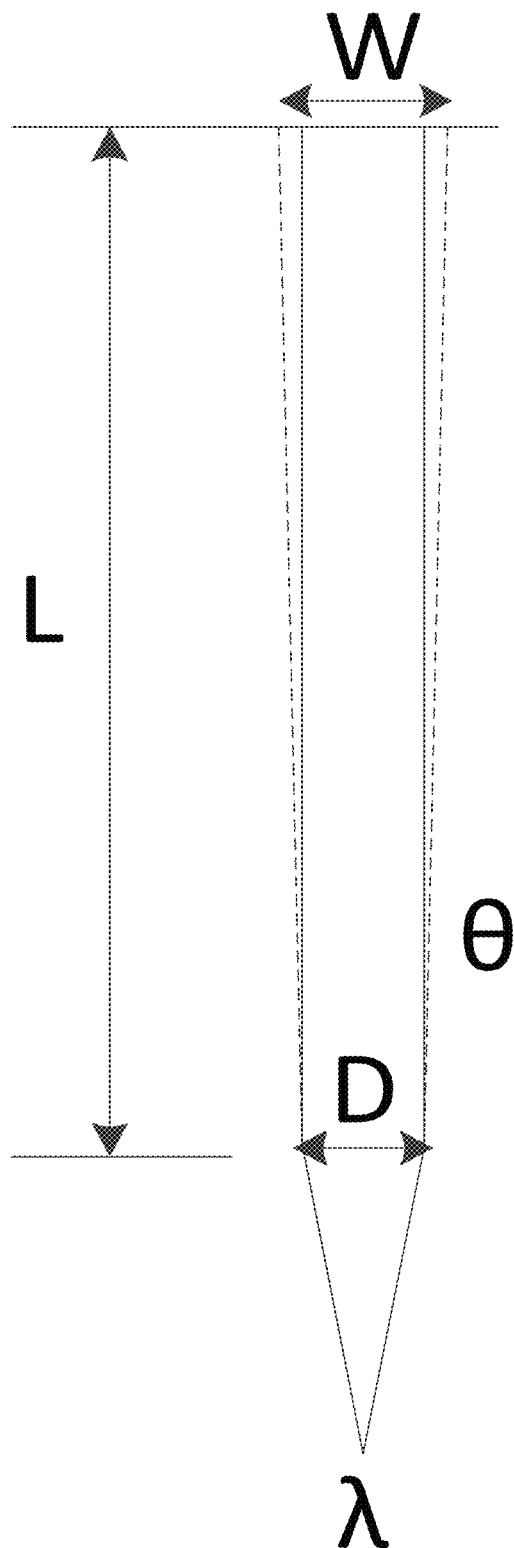
FIG. 8 is a schematic diagram of a width of a view region where an ideal monochromatic point light source is collimated into parallel light.

As shown in FIG. 8, for an ideal monochromatic point light source, when diffraction is not considered, light is collimated into parallel light through an ideal lens, but under influence of aperture diffraction of the cylindrical lens, an emergent beam has a diffraction angle θ as shown in FIG. 8 (an included angle between a dotted line and a solid line in FIG. 8):

$$\theta = \frac{\lambda}{D}. \tag{3}$$

Figure 9:
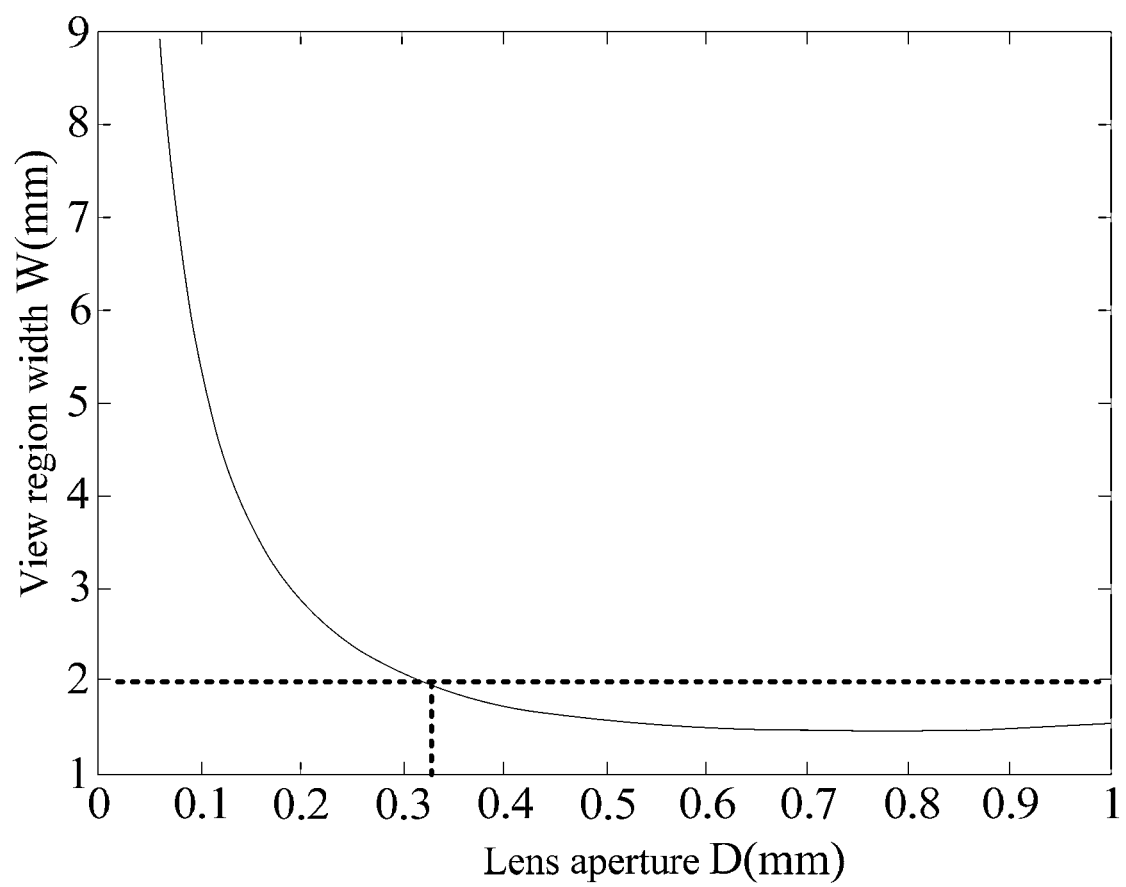
FIG. 9 is a schematic diagram of widths of view regions of a point light source diffracted at a 500 mm distance through different apertures.

The width W of the view region formed by the light emitted by each sub-pixel being propagated to the human eye through the lens satisfies:

$$w = D + 2L \tan \theta \tag{4}$$

θ in formulas (3) and (4) is an diffraction angle of the light emitted by the sub-pixel, θ is a radian, λ is a wavelength of the light emitted by the sub-pixel, D is the aperture of the lens, and L is the distance between the human eye and the lens layer. For example, L=500 mm and λ=550 nm, a curve relationship between the width W of the view region and the aperture D of the cylindrical lens is as shown in FIG. 9. Because under a condition of no considering diffraction and aberration, the projection width of each sub-pixel is 2 mm, a width of a whole projection of the sub-pixels is not larger than 4 mm, and the projection width under the influence of diffraction is smaller than 2 mm. As can be obtained from FIG. 9, the aperture of the cylindrical lens corresponding to the width W of the view region being smaller than 2 mm is larger than or equal to 0.33 mm.

The above limitation condition of the aperture is calculated based on the ideal lens, while practically in consideration of influence of aberration of the lens, a minimum value of the aperture D of each cylindrical lens is slightly larger than 0.33 mm, i.e. the aperture D of the lens is larger than 330 μm.

Figure 10:
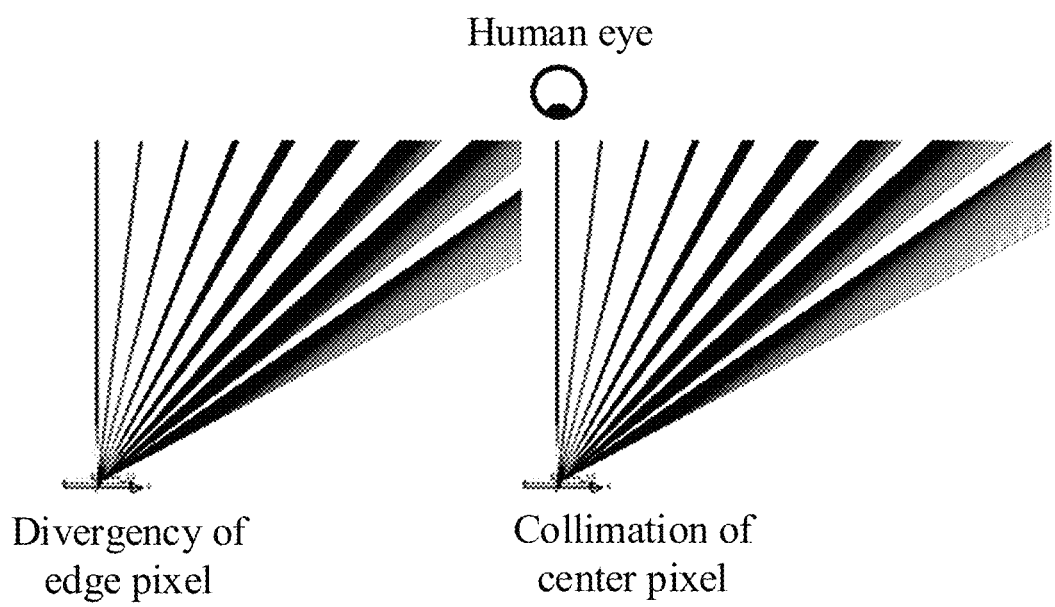
FIG. 10 is a schematic diagram of divergence of edge pixels and collimation of center pixels.

As shown in FIG. 10, due to influence of off-axial aberration of the lens, complete collimation of pixels from a center to an edge cannot be realized, so the curvature radius needs to be optimized so that the projection widths (the width W of the view region) of the beams emitted by the pixels from the center to the edge is smaller than the pupil diameter.

Around the above designed theoretical curvature radiuses and the limitation conditions of the apertures of the cylindrical lenses, the apertures and the curvature radiuses of the cylindrical lenses are scanned by optical software to obtain a projection width (the width W of the view region) of a beam emitted under each parameter combination at a 500 mm location, and the projection width of the beam emitted by each center sub-pixel at the 500 mm location and the projection width of the beam emitted by each edge sub-pixel at the 500 mm location are scanned. A simulation result (not shown) shows that, within an effective limitation range of the apertures of the cylindrical lenses, a main factor deciding a magnitude of the projection widths of the beams is the curvature radiuses of the cylindrical lenses, valued between 680 μm and 700 μm. In comprehensive consideration of the center pixels and the edge pixels, the projection widths of the emergent beams are selected to be equal as much as possible and are smaller than a projection width of 4 mm, an obtained optimal value of the curvature radius r is 690 μm, and the apertures of the cylindrical lenses are larger than or equal to 400 μm.

Figure 11:
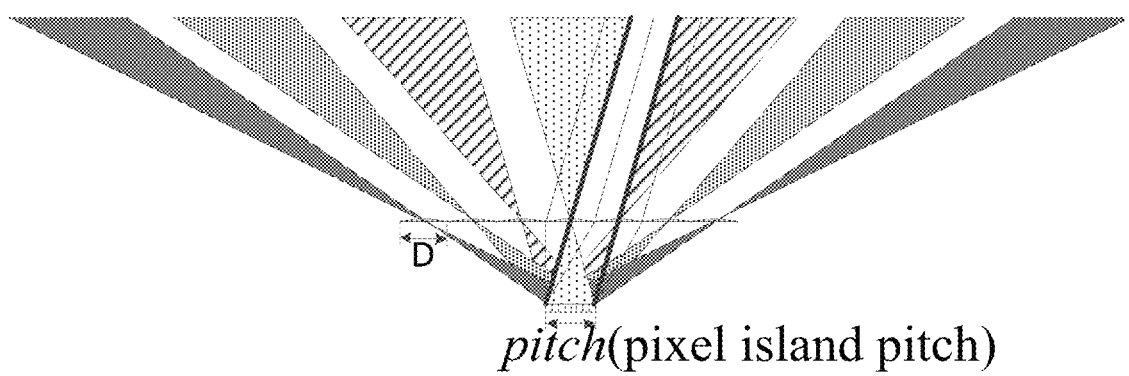
FIG. 11 is a schematic diagram of a spatial projection of light emitted by a sub-pixel through a cylindrical lens.
Figure 12:
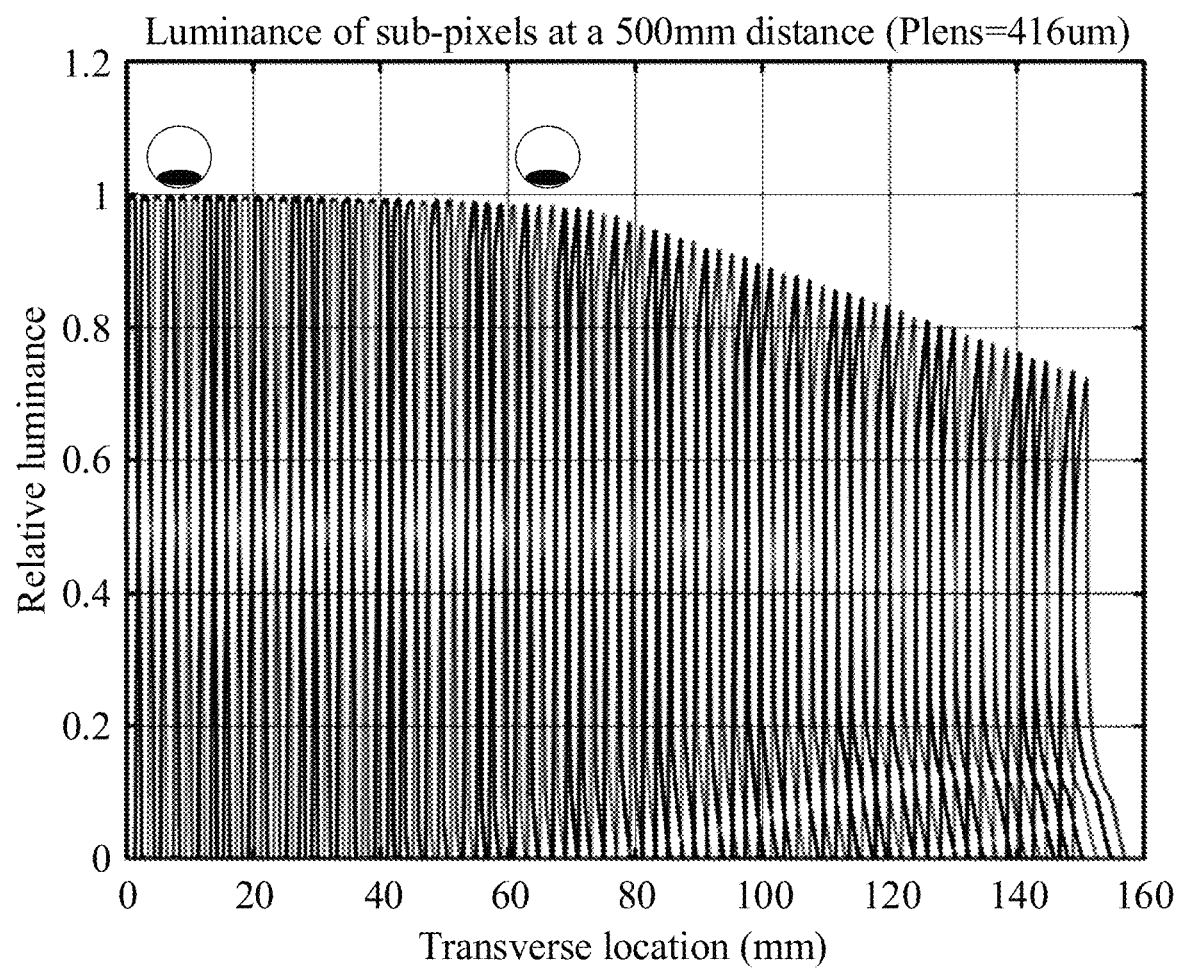
FIG. 12 is a schematic diagram of luminance of sub-pixels at a 500 mm distance.

Then, an optimal aperture of cylindrical lens is determined: as shown in FIG. 11, the aperture of each cylindrical lens is designed to be equal to the pitch of each pixel island, so that projection regions of the pixel islands in space through the cylindrical lenses are tangent to one another (in FIG. 11, two black thick lines are boundary lines of two adjacent view regions and are parallel to each other, a gap between the two black thick lines is equal to the aperture D of the corresponding cylindrical lens, and a practical width of the two black thick lines is also equal to the aperture D of the cylindrical lens, so any two boundary lines are closely contacted). Therefore, the human eye can see the pixel island at any region in space. FIG. 12 is distribution of projection luminance of sub-pixels in each pixel island at a 500 mm watching distance passing three consecutive cylindrical lenses (for example, the apertures of the cylindrical lenses are 416 μm, and the apertures of the cylindrical lenses are represented by Plens in FIG. 12). A zero point in a transverse location (mm) in FIG. 12 refers to a center location between a center of the display panel and the 500 mm watching distance, and the human eye moves left and right relatively to the center location to obtain the transverse locations (mm) in FIG. 12. It can be seen that at the 500 mm watching distance, two sub-pixels may enter the pupil, i.e. two viewpoints of the pupil are satisfied, and the energy projection peaks of the sub-pixels may satisfy the peak recognition conditions shown in FIG. 7A and FIG. 7B. Therefore, an essential condition for realizing light field 3D display without any conflict between convergence and focusing may be satisfied.

It should be noted that, in order to achieve good 3D display, it is necessary that left and right eyes cannot see a same sub-pixel simultaneously (seeing the same sub-pixel is equivalent to 100% interference), and it is also necessary that view interference between the left and right eyes is smaller than 10% (a national standard). The view interference of the left and right eyes is defined as follows.

Left eye interference=$E_{left\ eye\ looking\ at\ the\ right}$/$E_{left\ eye\ looking\ at\ the\ left}$ Right eye interference=$E_{right\ eye\ looking\ at\ the\ left}$/$E_{right\ eye\ looking\ at\ the\ right}$ (5).

$E_{left\ eye\ looking\ at\ the\ right}$ refers to light-emitting brightness of sub-pixels corresponding to the right eye viewed by the left eye, $E_{left\ eye\ looking\ at\ the\ left}$ refers to light-emitting brightness of all sub-pixels corresponding to the left eye, $E_{right\ eye\ looking\ at\ the\ left}$ refers to light-emitting brightness of sub-pixels corresponding to the left eye viewed by the right eye, and $E_{right\ eye\ looking\ at\ the\ right}$ refers to light-emitting brightness of sub-pixels corresponding to the right eye.

An interference calculation rule is as follows.
(1) Energy distribution of each sub-pixel in space is obtained through optical software simulation.
(2) Reverse tracing is performed according to coordinates of the two eyes to respectively calculated sub-pixels that can be viewed, the sub-pixels viewed by the left eye are called left sub-pixels, and the sub-pixels viewed by the right eye are called right sub-pixels.
(3) Energy of the left and right sub-pixels viewed by the left eye and energy of the left and right sub-pixels viewed by the right eye are respectively extracted according to the energy distribution of the corresponding sub-pixels, and then calculation is performed according to the above defined interference calculation formula (5), to obtain interference distribution of an entire visual space.

Figure 13A:
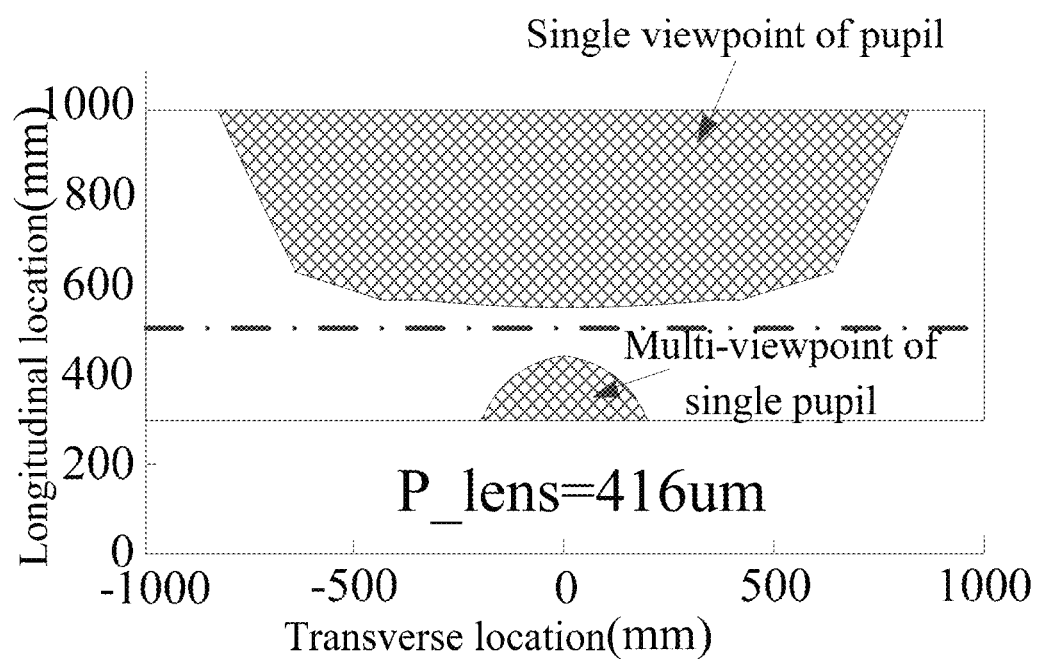
FIG. 13A to FIG. 13E are schematic diagrams of visual spaces with binocular interference smaller than 10% obtained respectively under different apertures of cylindrical lenses.
Figure 13B:
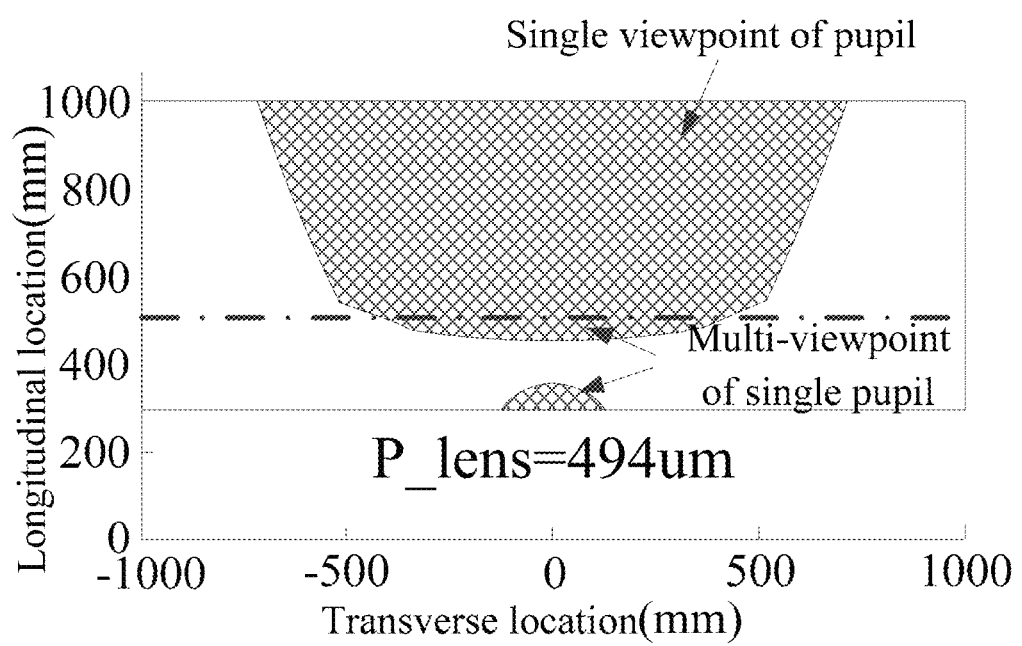

According to the above calculation rule, visual spaces with binocular interference smaller than 10% obtained under different apertures of the cylindrical lenses as shown in FIG. 13A to FIG. 13 E are given. A 3D resolution in FIG. 13A is 720×1080, a 3D resolution in FIG. 13B is 606×1080, a 3D resolution in FIG. 13C is 500×1080, a 3D resolution in FIG. 13D is 426×1080, a 3D resolution in FIG. 13E is 372×1080, and L=500 mm. In FIG. 13A to FIG. 13 E, P_lens is the aperture D of each cylindrical lens. Because the aperture of the cylindrical lens is equal to the pitch of the pixel island and the pixel island consists of a plurality of sub-pixels, the aperture of the cylindrical lens is an integer multiple of the pitch ($P_{pixel}$) of the corresponding sub-pixel. In an embodiment, the pitch ($P_{pixel}$) of each sub-pixel is valued at 13 μm.

A pattern-filled region in FIG. 13A to FIG. 13E is the visual space with the interference smaller than 10%, the transverse location is a spatial location parallel to a direction of a connecting line between the two eyes, and a longitudinal location is a front-back distance of watching. In addition, at a spatial location perpendicular to the direction of the connecting line between the two eyes, the cylindrical lenses do not realize an effect of regulation and control, so a location in the direction with the interference of smaller than 10% is infinite in theory; and the direction generally does not attract people's attention, so fine simulation calculation is not performed. A dotted line at the longitudinal location of 500 mm in FIG. 13A to FIG. 13E is a boundary line of a single viewpoint of the pupil and a plurality of viewpoints of the pupil. A region outside 500 mm is a view region with a single viewpoint of the pupil, and a region within 500 mm is a view region with a plurality of viewpoints of the pupil.

Figure 13C:
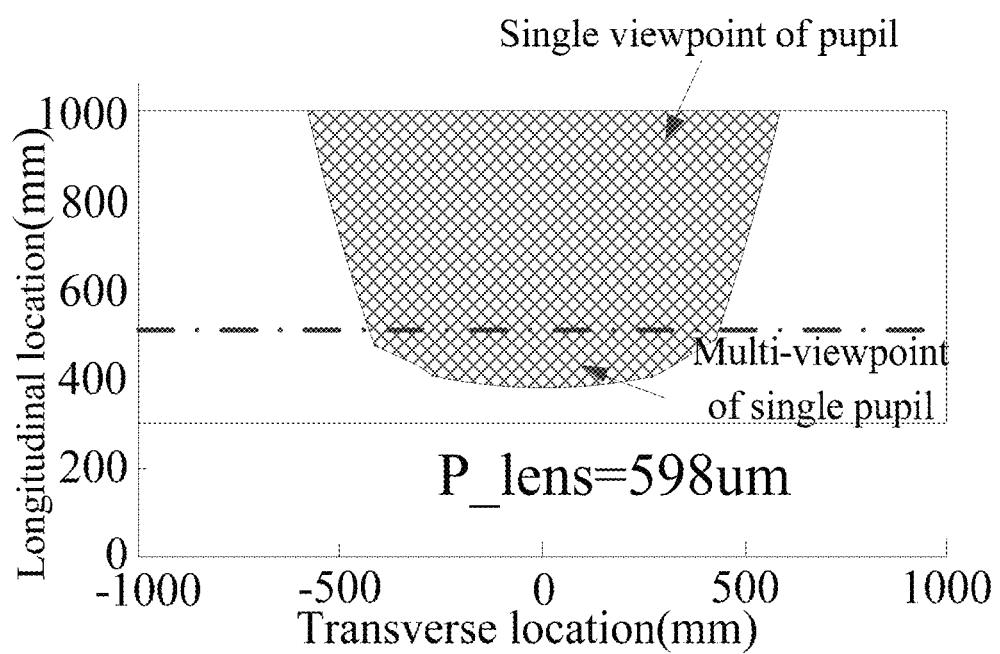
Figure 13D:
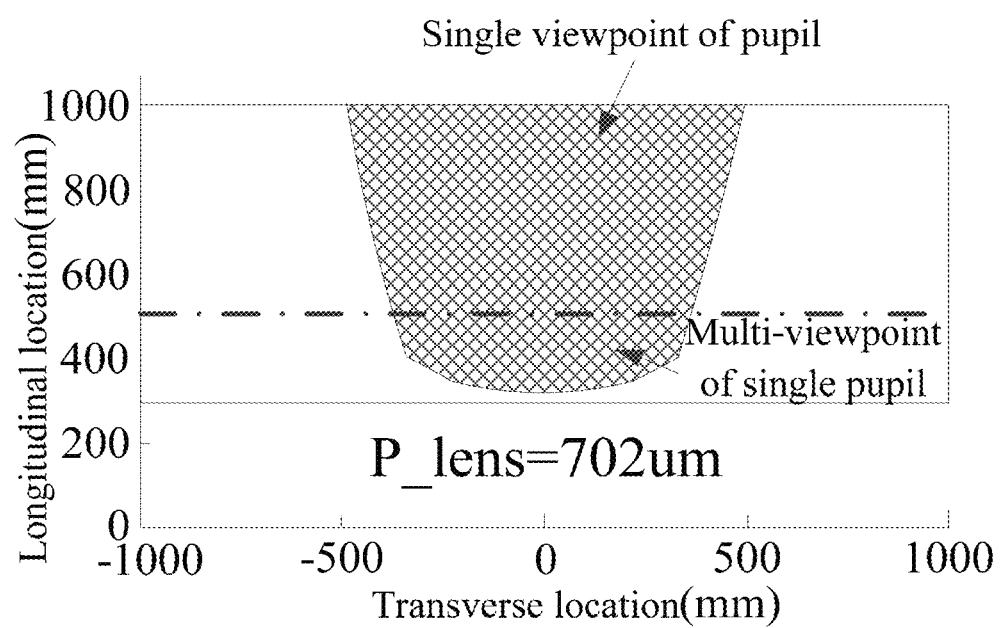
Figure 13E:
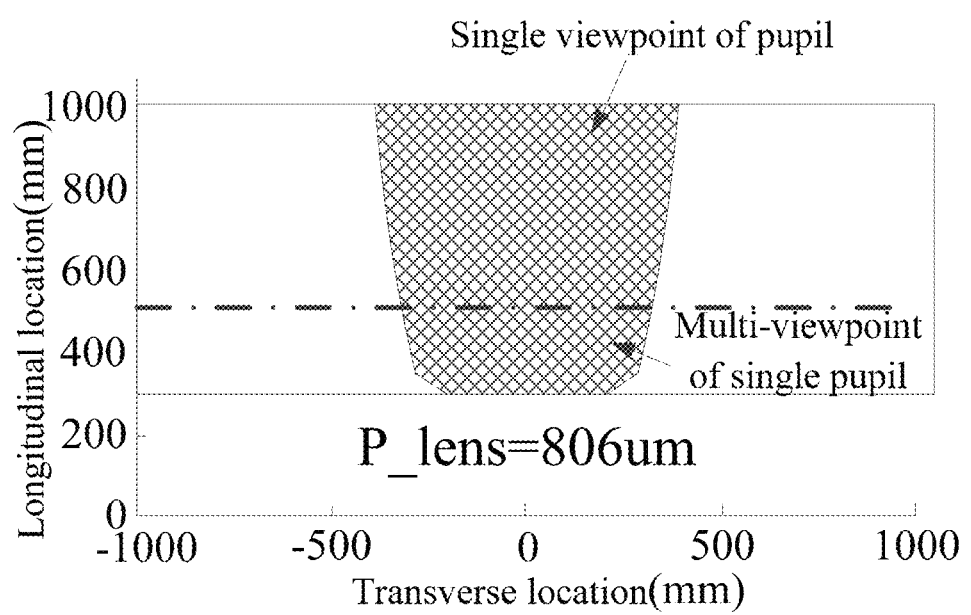

It can be seen from a result of the visual spaces with the interference smaller than 10% obtained through scanning the above apertures of the cylindrical lenses that, with increase of the apertures of the cylindrical lenses, longitudinal visual spaces are larger and more consecutive; but due to influence of aberration caused by increased apertures, a transverse range is reduced with the increase of the apertures of the cylindrical lenses, and the 3D resolutions are reduced with the increase of the apertures of the cylindrical lenses (because transverse 3D resolutions equal to the quantity of the cylindrical lenses). Therefore, in comprehensive consideration of ranges of the visual spaces and the 3D resolutions, as well as existence of the region with a plurality of viewpoints of the pupil at the optimal watching distance L=500, a relatively optimal aperture of the cylindrical lenses is 598 μm (as shown in FIG. 13C). It may be seen from FIG. 13C that, the aperture of the cylindrical lenses is designed to be 598 μm to obtain size data of the visual spaces with the interference smaller than 10% as follows.

A visual space with the interference smaller than 10%: area: >2.74 m$^2$; longitudinal location: 375 mm to 2500 mm.

A view region satisfying a plurality of monocular viewpoints: area: >0.083 m$^2$; transverse location: −430 mm to 430 mm; longitudinal location: 375 mm to 500 mm.

In conclusion, relatively optimal design parameters of the cylindrical lenses are obtained: the placing height H=4.88 mm, the curvature radius r=690 μm, and the aperture D=598 μm.

In addition, because the present disclosure may perform division of a plurality of types of pixel islands utilizing a pixel strip structure with light emission by consecutive sub-pixels, design of a plurality of apertures of the cylindrical lenses may be performed on the same display screen. Therefore, in combination with an optical device (such as the liquid crystal lenses or liquid lenses) with variable apertures of cylindrical lens, intelligent 3D display with a plurality of resolutions and a plurality of visual spaces that can be switched as shown in FIG. 13A to FIG. 13E can be realized.

Figure 14:
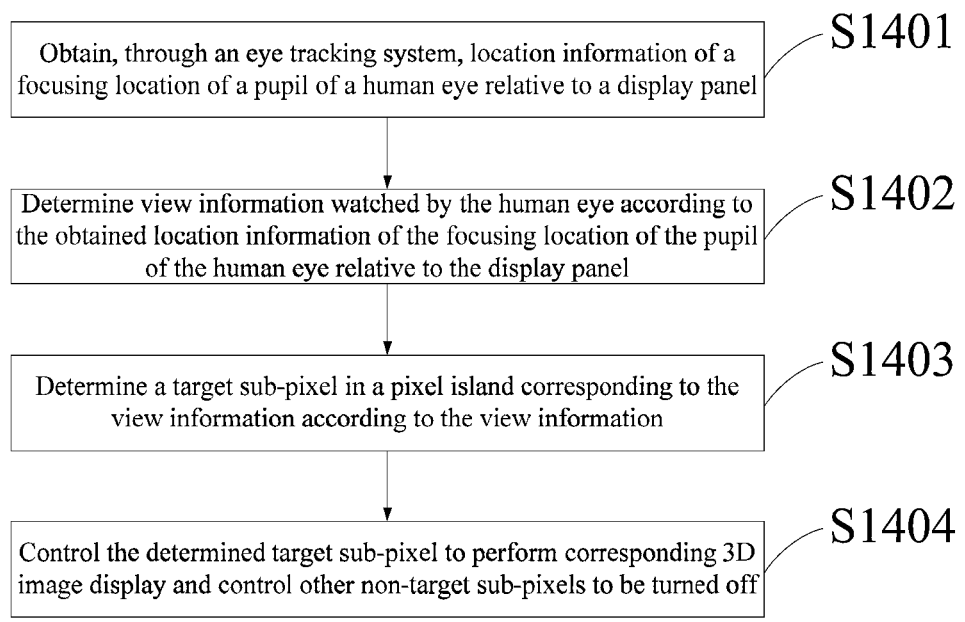
FIG. 14 is a flow chart of a display method of a light field display apparatus provided by an embodiment of the present disclosure.

Based on the same inventive concept, an embodiment of the present disclosure further provides a display method of the above light field display apparatus. As shown in FIG. 14, the method includes following steps.

S1401, location information of a focusing location of a pupil of a human eye relative to a display panel is obtained through an eye tracking system.

S1402, view information watched by the human eye is determined according to the obtained location information of the focusing location of the pupil of the human eye relative to the display panel.

S1403, a target sub-pixel in a pixel island corresponding to the view information is determined according to the view information.

S1404, the determined target sub-pixel is controlled to perform corresponding 3D image display and other non-target sub-pixels are controlled to be turned off.

Figure 15:
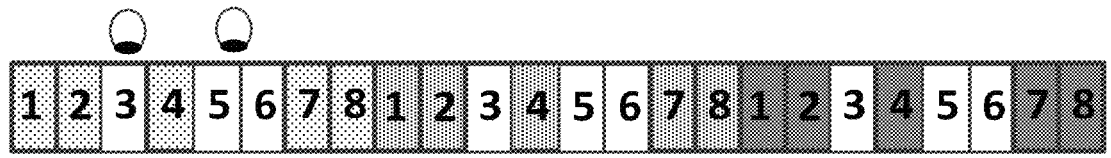
FIG. 15 is a schematic diagram of combining an eye tracking system for layout process.

As shown in FIG. 15, FIG. 15 illustrates 8 sub-pixels constituting a pixel island, and illustrates a projection region of three pixel islands passing three cylindrical lenses at a certain spatial location (any spatial location that can be recognized by the human eye) taking three pixel islands arranged in a first direction as an example and each pixel island corresponding to a cylindrical lens. FIG. 15 only illustrates 8 sub-pixels constituting a pixel island, and a pixel island of a practical product includes more than 8 sub-pixels. During specific implementation, layout processing is performed in combination with the eye tracking system; and 3D display may be realized when tracking is turned on to obtain the sub-pixels (sub-pixels 3, 5 and 6) corresponding to two eyes, corresponding 3D view information is loaded, and other sub-pixels are turned off. When a projection width of each sub-pixel is smaller than a pupil radius, light field 3D display without any conflict between convergence and focusing can be realized. It should be noted that, in order to avoid layout conflict in tracking, it needs to be ensured that the two eyes cannot see a same sub-pixel simultaneously. A visual space with interference smaller than 10% is given before, and in the visual space, the two eyes will not see the same sub-pixel.

Figure 16A:
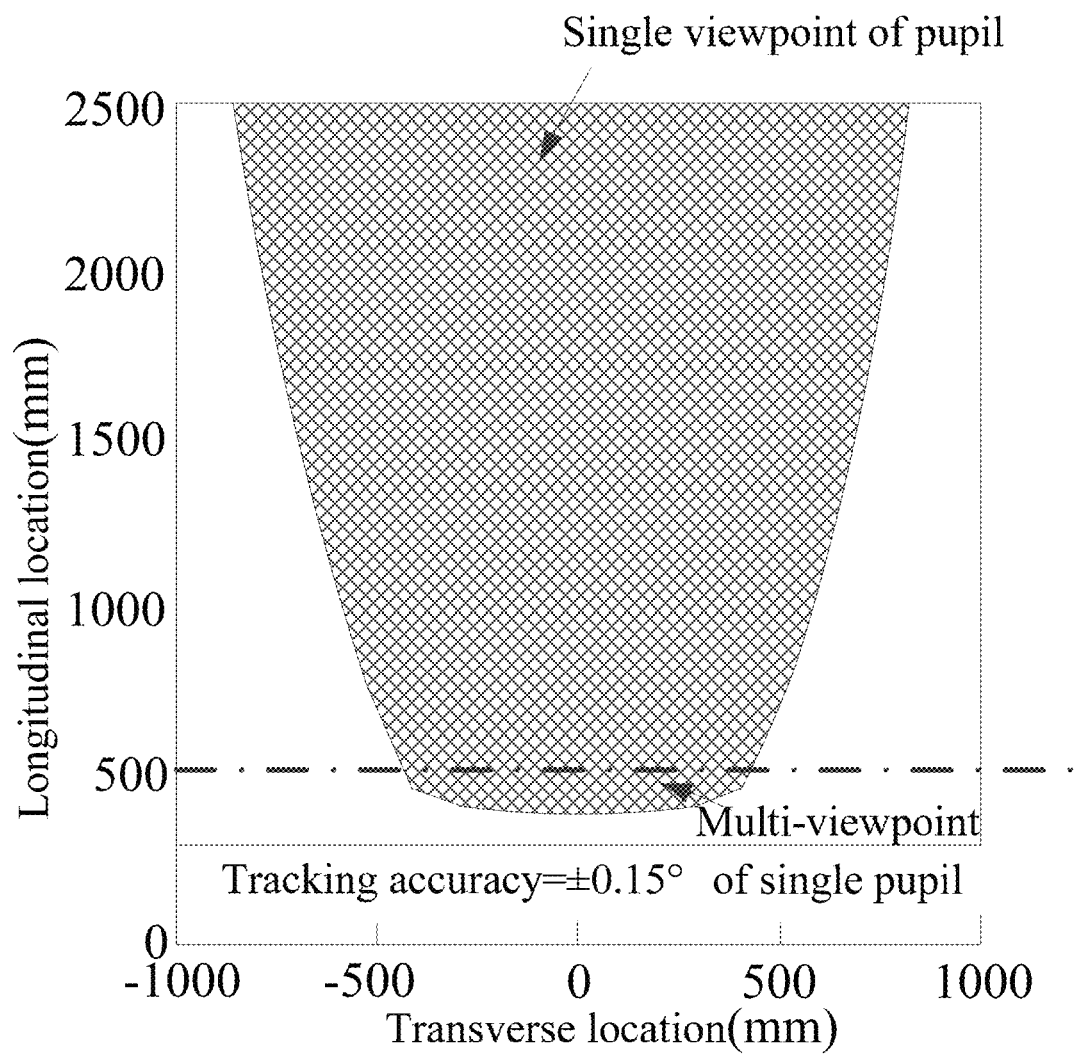
FIG. 16A is a schematic diagram of a simulation result when a tracking accuracy of an eye tracking system is +/−0.15°.
Figure 16B:
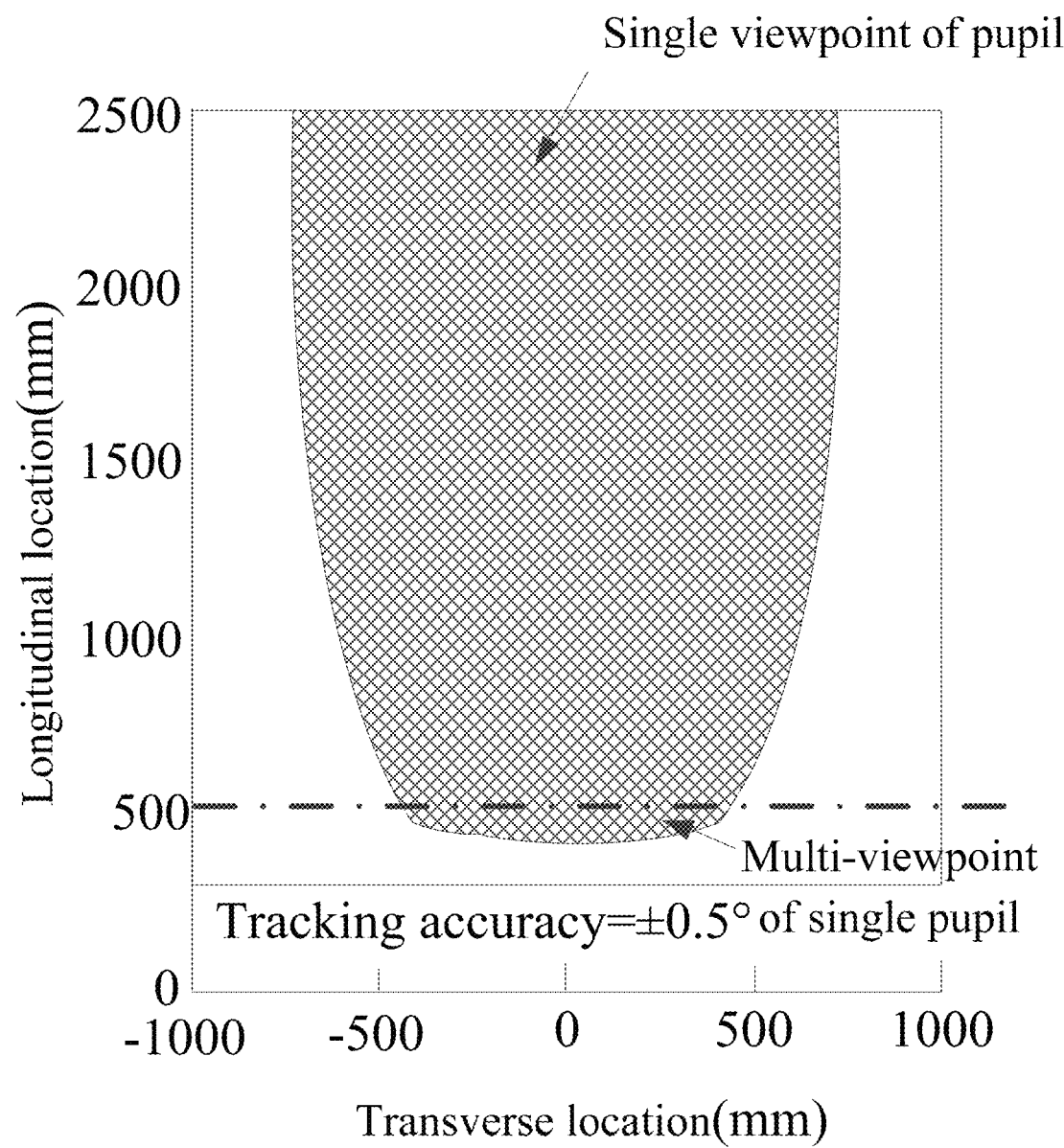
FIG. 16B is a schematic diagram of a simulation result when a tracking accuracy of an eye tracking system is +/−0.5°.

The above design result is a design result based on tracking accuracy=0°. If a certain eye tracking error exits, all sub-pixels corresponding to locations that may appear in the human eye within a range of the tracking error need to be turned on (it may be understood as the pupil of the eye in FIG. 15 is larger, which is equivalent to a diameter of a region that may appear in the eye). In this way, the visual space with low interference will be reduced. FIG. 16A and FIG. 16B respectively show simulation results of tracking accuracy=+/−0.15° and tracking accuracy=+/−0.5°. It can be seen from the simulation results that, the tracking accuracy only affects a size of the visual space to a small extent.

In conclusion, according to the light field display apparatus and the driving method thereof provided by embodiments of the present disclosure, the display panel includes the plurality of sets of pixel strips, each set of pixel strips includes the plurality of sub-pixel strips in different colors, each sub-pixel strip includes the plurality of sub-pixels in the same color, and the spacing between two adjacent sub-pixels in each sub-pixel strip is smaller than or equal to 2 μm, so each sub-pixel strip forms a continuous light-emitting surface and each set of pixel strips may be divided into a plurality of types of pixel islands, i.e. a design of the plurality of types of pixel islands may be performed on the same display panel. Correspondingly, a design of a plurality of types of lens pitches may be performed, and intelligent 3D display with a plurality of resolutions and a plurality of visual spaces that can be switched can be realized. In an embodiment of the present disclosure, the width of the orthographic projection of each pixel island on the display panel is equal to the aperture of the corresponding lens, so that vision regions projected by the pixel islands in space through the lenses may be connected with one another in a seamless mode, thereby realizing an ultra-large continuous 3D visual space. In addition, spacing between the pixel islands divided in each set of pixel strips is smaller than or equal to 2 μm, so a moire effect may be eliminated. Further, layout processing is performed in combination with the eye tracking system; and 3D display can be realized when tracking is turned on to obtain the sub-pixels corresponding to two eyes, the corresponding 3D view information is loaded, and other sub-pixels are turned off. Therefore, the light field display apparatus provided by an embodiment of the present disclosure can realize light field 3D display with low interference, zero moire effect and a plurality of viewpoints.

While embodiments of the present disclosure have been described, additional changes and modifications to these embodiments may be made by those of skill in the art once they are aware of basic inventive concepts. Therefore, the appended claims are intended to be construed to include embodiments and all changes and modifications that fall within the scope of the present disclosure.

Obviously, those of skill in the art can make various changes and modifications to embodiments of the present disclosure without departing from the spirit and scope of embodiments of the present disclosure. Thus, provided that these changes and modifications of embodiments of the present disclosure fall within the scope of the claims of the present disclosure and their equivalents, the present disclosure is also intended to cover such changes and modifications.

What is claimed is:

1. A light field display apparatus, comprising:
a display panel, comprising a plurality of sets of pixel strips extending in a first direction and arranged in a second direction, wherein the first direction intersects with the second direction, each set of pixel strips comprises a plurality of sub-pixel strips in different colors, each sub-pixel strip comprises a plurality of sub-pixels in a same color, spacing between every two adjacent sub-pixels in each sub-pixel strip in the first direction is smaller than or equal to 2 μm, each set of pixel strips is divided into a plurality of pixel islands arranged in an array in the first direction, and each pixel island comprises at least four sub-pixels extending in the first direction in each corresponding sub-pixel strip;
a light-transmitting spacer layer, located on a light-emitting side of the display panel; and
a lens structure, located on a side of the light-transmitting spacer layer facing away from the display panel, wherein the lens structure comprises a plurality of lenses arranged in an array and having a light-converging effect; wherein
a width of a view region formed by light emitted by each sub-pixel in each pixel island being propagated to a human eye through a corresponding lens is smaller than or equal to a pupil diameter, and a distance between centers of view regions formed by light emitted by adjacent sub-pixels in each pixel island being propagated to the human eye through the corresponding lens is smaller than or equal to a pupil radius; and a width of an orthographic projection of each pixel island on the display panel is equal to an aperture of the corresponding lens in the first direction.

2. The light field display apparatus according to claim 1, wherein the spacing between every two adjacent sub-pixels in each sub-pixel strip is 0 µm-1 µm.

3. The light field display apparatus according to claim 1, wherein one of the lenses corresponds to one of the pixel islands, or one of the lenses corresponds to a plurality of the pixel islands.

4. The light field display apparatus according to claim 1, wherein the lens structure comprises: a lens layer located on the side of the light-transmitting spacer layer facing away from the display panel, a flat layer located on a side of the lens layer facing away from the display panel, and a first substrate located on a side of the flat layer facing away from the display panel, wherein the lens layer comprises the plurality of lenses arranged in an array, and a refractive index of the lens layer is larger than a refractive index of the flat layer.

5. The light field display apparatus according to claim 4, wherein the lenses are cylindrical lenses, and the plurality of lenses are closely arranged; and a placing height H of each lens satisfies:

$$H = \frac{2nLp_{pixel}}{\Phi};$$

wherein the placing height H of each lens is a distance between the lens layer and the display panel, n is a refractive index of a dielectric layer between the lens layer and the display panel, $p_{pixel}$ is a width of each sub-pixel in the first direction, L is a distance between the human eye and the lens layer, and $\Phi$ is the pupil diameter of the human eye.

6. The light field display apparatus according to claim 5, wherein a curvature radius of each lens satisfies:

$$\frac{H}{n} = \frac{r}{n_1 - n_2};$$

wherein

H is the placing height of the lens, r is the curvature radius of the lens, n is a refractive index of a film layer between the lens layer and the display panel, $n_1$ is the refractive index of the lens layer, $n_2$ is the refractive index of the flat layer, and $n_1 > n_2$; and the width of the view region formed by the light emitted by each sub-pixel being propagated to the human eye through the lens satisfies:

$w = D + 2L \tan \theta$; wherein $$\theta = \frac{\lambda}{D},$$

$\theta$ is a diffraction angle of the light emitted by the sub-pixel, $\lambda$ is a wavelength of the light emitted by the sub-pixel, D is the aperture of the lens, and L is the distance between the human eye and the lens layer.

7. The light field display apparatus according to claim 6, wherein the aperture D of the lens is larger than 330 µm.

8. The light field display apparatus according to claim 7, wherein the placing height H of the lens is 4.88 mm, the curvature radius r of the lens is 690 µm, and the aperture D of the lens is 598 µm.

9. The light field display apparatus according to claim 1, wherein the lenses are liquid crystal lenses or liquid lenses.

10. The light field display apparatus according to claim 1, wherein focal lengths of the lenses are equal.

11. A display method of the light field display apparatus according to claim 1, comprising:

obtaining, through an eye tracking system, location information of a focusing location of a pupil of the human eye relative to the display panel;

determining view information watched by the human eye according to the obtained location information of the focusing location of the pupil of the human eye relative to the display panel;

determining a target sub-pixel in a pixel island corresponding to the view information according to the view information; and controlling the determined target sub-pixel to perform corresponding 3D image display and controlling other non-target sub-pixels to be turned off.

* * * * *